(12) United States Patent
Nam et al.

(10) Patent No.: US 11,045,043 B2
(45) Date of Patent: Jun. 29, 2021

(54) CONTAINER SUPPORT

(71) Applicant: LG Electronics Inc., Seoul (KR)

(72) Inventors: Hyeunsik Nam, Seoul (KR); Wansoo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 545 days.

(21) Appl. No.: 15/570,974

(22) PCT Filed: Sep. 23, 2016

(86) PCT No.: PCT/KR2016/010685
§ 371 (c)(1),
(2) Date: Oct. 31, 2017

(87) PCT Pub. No.: WO2017/052282
PCT Pub. Date: Mar. 30, 2017

(65) Prior Publication Data
US 2018/0110364 A1  Apr. 26, 2018

(30) Foreign Application Priority Data
Sep. 23, 2015 (KR) .................. 10-2015-0134688

(51) Int. Cl.
*A47J 36/34* (2006.01)
*H05B 6/12* (2006.01)
(Continued)

(52) U.S. Cl.
CPC .......... *A47J 36/34* (2013.01); *A47J 36/2483* (2013.01); *F01K 13/00* (2013.01); *H05B 6/06* (2013.01);
(Continued)

(58) Field of Classification Search
CPC ........ A47J 36/34; A47J 36/2483; F01K 13/00; H05B 6/06; H05B 6/062; H05B 6/08;
(Continued)

(56) References Cited

U.S. PATENT DOCUMENTS

| 3,742,179 A | 6/1973 | Harnden | |
|---|---|---|---|
| 2012/0043312 A1* | 2/2012 | Lee | H05B 6/062 |
| | | | 219/622 |
| 2016/0073451 A1* | 3/2016 | Reischmann | H05B 6/062 |
| | | | 219/660 |

FOREIGN PATENT DOCUMENTS

| JP | S63269488 | 11/1988 |
| JP | 2009006049 | * 1/2009 |

(Continued)

OTHER PUBLICATIONS

Extended European Search Report in European Application No. 16849007.6, dated Apr. 23, 2019, 7 pages.
(Continued)

*Primary Examiner* — Shawntina T Fuqua
(74) *Attorney, Agent, or Firm* — Fish & Richardson P.C.

(57) ABSTRACT

A container support is disclosed. The container support is operated in conjunction with an induction heating unit, which is disposed beneath a table and generates a magnetic field, and includes a plate for supporting a cooking container placed thereon, a manipulation unit provided at a portion of the plate so as to receive control commands from a user, and a signal-transmitting part provided at a portion of the plate so as to transmit electric signals to the induction heating unit.

17 Claims, 2 Drawing Sheets

(51) Int. Cl.
    *A47J 36/24*     (2006.01)
    *F01K 13/00*     (2006.01)
    *H05B 6/06*     (2006.01)
    *H05B 6/08*     (2006.01)
    *H05B 6/44*     (2006.01)

(52) U.S. Cl.
    CPC ............... *H05B 6/062* (2013.01); *H05B 6/08* (2013.01); *H05B 6/1209* (2013.01); *H05B 6/44* (2013.01); *H05B 2213/07* (2013.01); *Y02B 40/00* (2013.01)

(58) Field of Classification Search
    CPC .... H05B 6/1209; H05B 6/44; H05B 2213/07; Y02B 40/123
    See application file for complete search history.

(56) References Cited

FOREIGN PATENT DOCUMENTS

| JP | 2010049959 | * | 3/2010 |
|---|---|---|---|
| KR | 10-2005-0056049 | | 6/2005 |
| KR | 10-2005-0056726 | | 6/2005 |
| KR | 101363250 | * | 2/2014 |

OTHER PUBLICATIONS

International Search Report and Written Opinion in International Application No. PCT/KR2016/010685, dated Dec. 8, 2016, 12 pages (with English translation).

* cited by examiner

[Fig. 1]
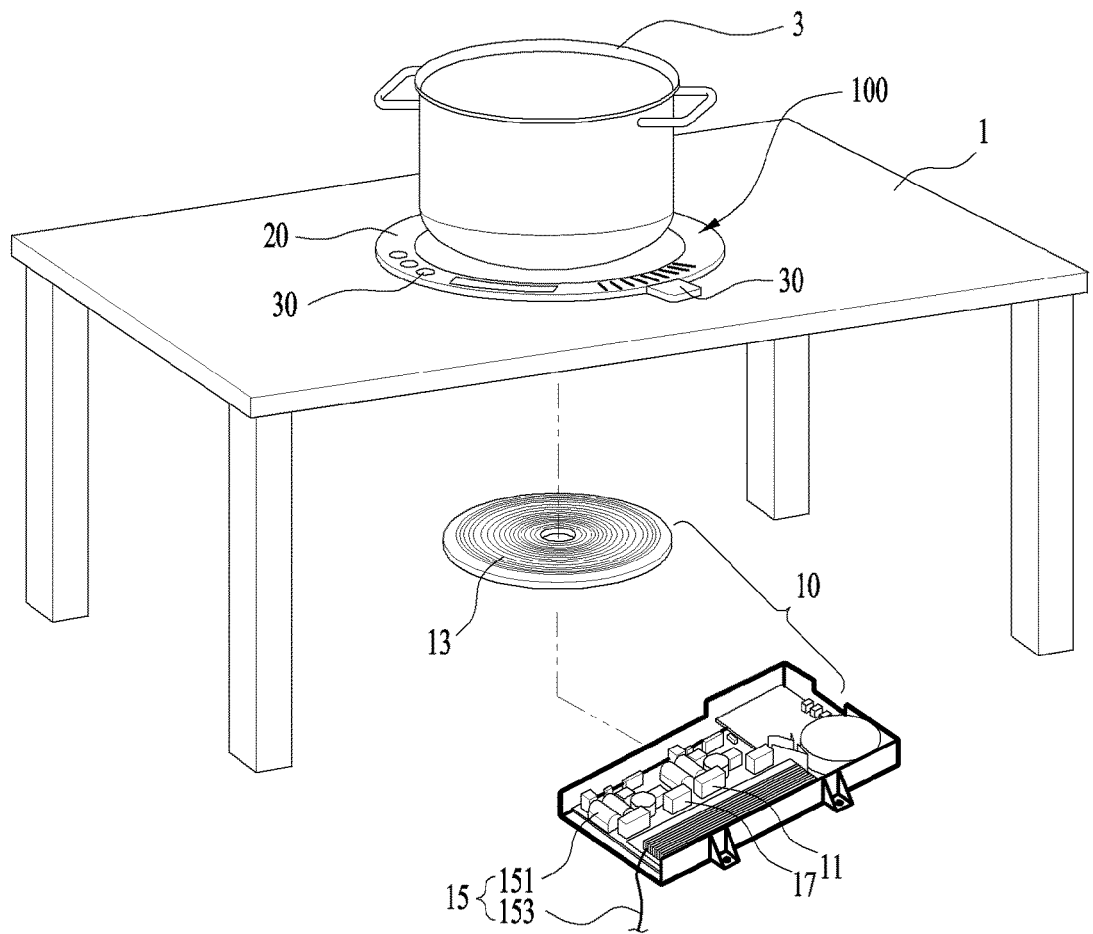
[Fig. 2]
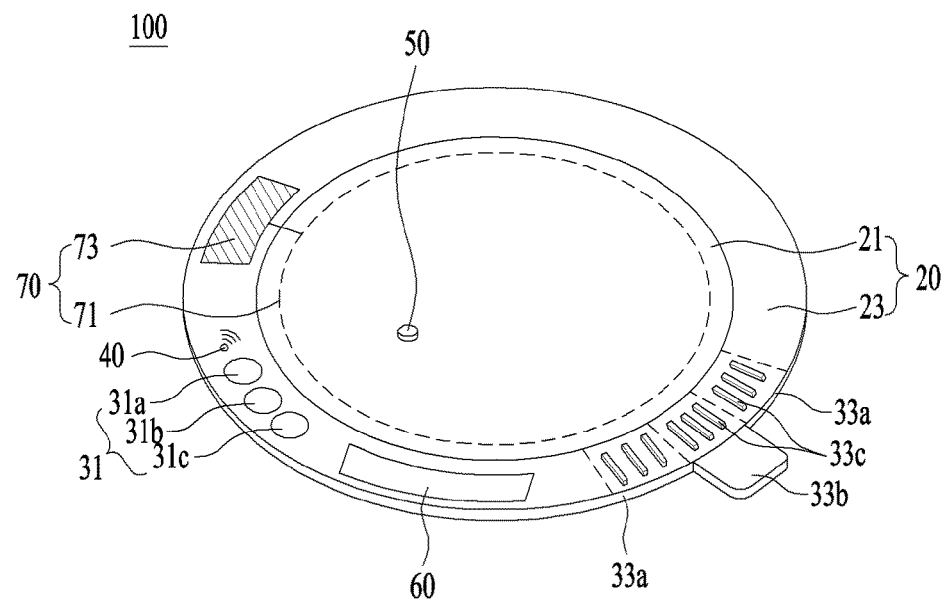

[Fig. 3]
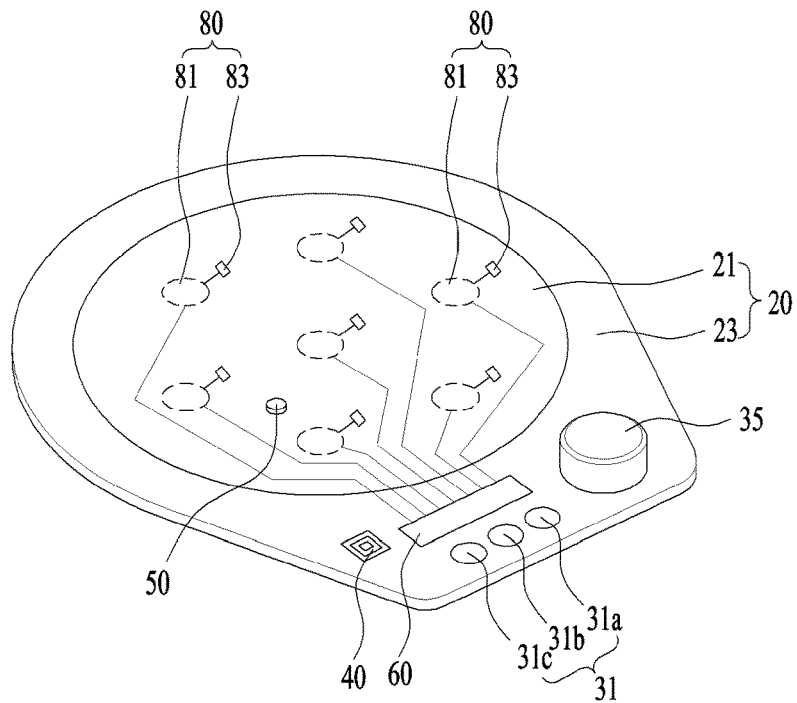
[Fig. 4]
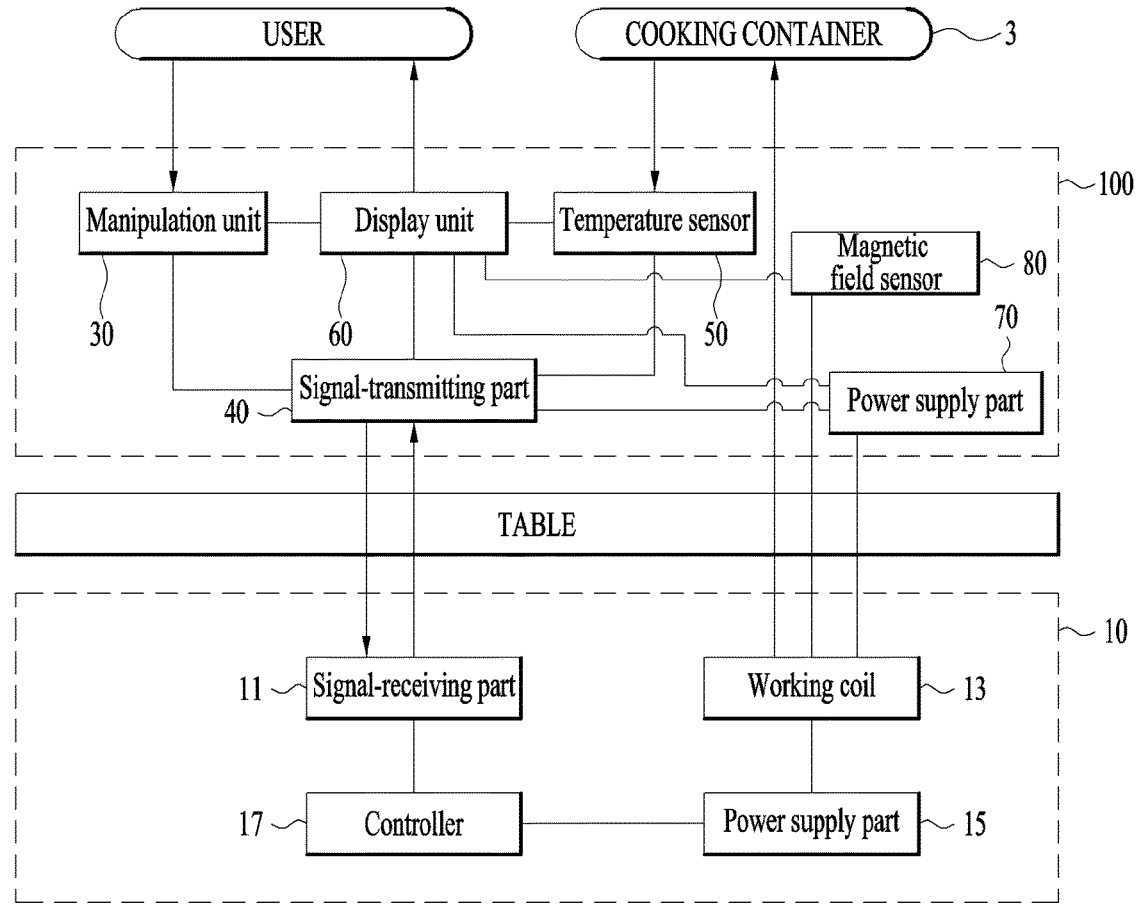

CONTAINER SUPPORT

CROSS-REFERENCE TO RELATED APPLICATIONS

This application is a National Stage application under 35 U.S.C. § 371 of International Application No. PCT/KR2016/010685, filed Sep. 23, 2016, which claims the benefit of Korean Application No. 10-2015-0134688, filed on Sep. 23, 2015. The disclosures of the prior applications are incorporated by reference in their entirety.

TECHNICAL FIELD

The present invention relates to a container support, and more particularly, to a container support that is operated in conjunction with an induction heating unit.

BACKGROUND ART

In general, an induction heating (IH) apparatus is an electromagnetic induction heating cooking apparatus.

A typical IH apparatus includes a top plate, on which a cooking container is placed, and a working coil, which is provided inside the top plate in order to generate a magnetic field.

According to an operating principle of such an IH apparatus, when current is applied to the working coil, a magnetic field is generated around the working coil, and an eddy current is generated in the cooking container due to a resistance component (steel) included in the cooking container when the magnetic field passes through the cooking container. Because the cooking container is made from a resistance component, the cooking container is heated due to the eddy current, and thus the food in the cooking container is cooked.

Because only the cooking container is heated by the eddy current and the top plate of the IH apparatus is not heated, there is no risk of a user getting burned even when touching the top plate, and there is a merit of excellent energy efficiency.

In general, the IH apparatus may be manufactured integrally with or separately from a table. The IH apparatus, which is manufactured separately from a table, has the advantage of being portable, but is inconvenient to use because a user must place the IH apparatus on the table whenever desiring to use the same. Meanwhile, the IH apparatus, which is manufactured integrally with the table, is mounted inside the table such that a user can see the working coil from above the table. However, this IH apparatus has drawbacks of a high price and a poor aesthetic appearance because the working coil can be seen from the exterior. Therefore, conventionally, the IH apparatus is mounted beneath the table, and a cooking container is placed on the table equipped with the IH apparatus.

However, there is a problem in that the table is damaged by the heated cooking container.

Further, there is a problem in that it is inconvenient to manipulate the IH apparatus because a manipulation unit is provided at the IH apparatus.

Furthermore, there is a problem in that it is difficult to check the control information of the IH apparatus because a display unit for displaying the control information is provided at the IH apparatus.

DISCLOSURE OF INVENTION

Technical Problem

An object of the present invention devised to solve the problems lies in a container support, which is operated in conjunction with an induction heating unit, which is disposed beneath a table, thereby controlling the induction heating unit.

Another object of the present invention devised to solve the problems lies in a container support, which is capable of preventing a table from being damaged by a heated cooking container.

A further object of the present invention devised to solve the problems lies in a container support, which enables a user to input cooking information, such as heating intensity, cooking temperature, cooking time and so on, to the container support, thereby controlling the induction heating unit.

Another further object of the present invention devised to solve the problems lies in a container support, which is capable of displaying information about the cooked status of food cooked in a cooking container.

Still another further object of the present invention devised to solve the problems lies in a container support, which is capable of being accurately placed at a position on the top surface of a table that corresponds to the position of an induction heating unit.

Solution to Problem

The objects of the present invention can be achieved by providing a container support configured to be operated in conjunction with an induction heating unit, which is disposed beneath a table and generates a magnetic field, and including a plate for supporting a cooking container placed thereon, a manipulation unit provided at a portion of the plate so as to receive control commands from a user, and a signal-transmitting part provided at a portion of the plate so as to transmit electric signals to the induction heating unit.

Therefore, a user may adjust the intensity of heating of a cooking container by manipulating the manipulation unit without directly manipulating the induction heating unit disposed beneath the table.

The plate may be made of a heat-resistant material, such as heat-resistant synthetic resin, silicon or glass. Therefore, the table may be prevented from being damaged by the heated cooking container, and the container support having a heat-resistant property may be provided.

The container support may further include a display unit provided at a portion of the plate so as to display cooking information to a user.

Therefore, the user may check information, including heating time and heating intensity of the induction heating unit, using the display unit.

The container support may further include a temperature sensor provided at the plate so as to measure a temperature of the cooking container.

Therefore, the container support may measure a temperature of the cooking container using the temperature sensor.

Temperature information detected by the temperature sensor may be transmitted to the induction heating unit through the signal-transmitting part, and the induction heating unit may adjust an intensity of the magnetic field depending on the temperature information transmitted thereto.

The induction heating unit may include a signal-receiving part for receiving electric signals transmitted from the signal-transmitting part, a working coil for generating a magnetic field by receiving current, a power supply part for supplying current to the working coil, and a controller connected to the signal-receiving part and the power supply part.

In this case, the temperature information detected by the temperature sensor may be transmitted to the signal-receiving part and the controller through the signal-transmitting part, and the controller may control the power supply part based on the detected temperature information, thereby adjusting an intensity of the magnetic field generated from the working coil.

The container support may further include a power supply part for supplying power to the signal-transmitting part or the display unit.

Therefore, since the container support has no electric wire for connection with an external power source, a user may place the container support on the table when necessary and may remove the container support from the table when unnecessary, thereby improving an aesthetic appearance and utilization of the table.

The power supply part of the container support may generate induced electromotive force using the magnetic field generated from the induction heating unit and may use the induced electromotive force as a driving force.

Therefore, it may be possible to supply power to the container support using the magnetic field generated from the working coil.

The container support may further include a magnetic field sensor provided at the plate so as to enable a user to place the plate at a position on a top surface of the table corresponding to a position of the working coil.

Therefore, the container support may be placed directly on the induction heating unit.

The magnetic field sensor may be provided in a plural number, and the plurality of magnetic field sensors may be spaced a predetermined distance apart from a center portion of the plate.

Advantageous Effects of Invention

According to the present invention, a container support is operated in conjunction with an induction heating unit, which is disposed beneath a table, thereby controlling the induction heating unit.

Further, the container support is capable of preventing a table from being damaged by a heated cooking container.

Further, the container support enables a user to input cooking information, such as heating intensity, cooking temperature, cooking time and so on, to the container support, thereby controlling the induction heating unit.

Further, the container support is capable of displaying information about the cooked status of food cooked in a cooking container.

Further, the container support is capable of being accurately placed at a position on the top surface of a table that corresponds to the position of an induction heating unit.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 1 illustrates an example of use of a container support of the present invention;

FIG. 2 illustrates a container support according to one embodiment of the present invention;

FIG. 3 illustrates a container support according to another embodiment of the present invention; and FIG. 4 is a block diagram illustrating the relationship between the container support and an induction heating unit.

BEST MODE FOR CARRYING OUT THE INVENTION

Reference will now be made in detail to the preferred embodiments of the present invention, examples of which are illustrated in the accompanying drawings.

Unless otherwise defined, all terms used herein, which include technical or scientific terms, have the same meanings as those generally appreciated by those skilled in the art. The terms, such as ones defined in common dictionaries, should be interpreted as having the same meanings as terms in the context of pertinent technology, and should not be interpreted as having ideal or excessively formal meanings unless clearly defined in the specification.

A configuration and a control method of a device that will be described hereinafter are provided for explanation of the exemplarily embodiments of the present invention and are not intended to limit the technical scope of the present invention. Wherever possible, the same reference numbers will be used throughout the drawings to refer to the same or like parts.

FIG. 1 illustrates an example of use of a container support of the present invention. Hereinafter, a container support according to one embodiment of the present invention will be described with reference to FIG. 1.

A container support 100 according to one embodiment of the present invention is operated in conjunction with an induction heating unit 10, which is mounted beneath a table 1 and generates a magnetic field.

The container support 100 according to one embodiment of the present invention may include a plate 20, on which a cooking container 3 is placed, a manipulation unit 30, which is provided at a portion of the plate 20 and receives control commands from a user, and a signal-transmitting part 40, which is provided at a portion of the plate 20 and transmits electric signals to the induction heating unit 10.

Before explaining the container support according to one embodiment of the present invention, the induction heating unit 10 will be first explained.

The induction heating unit 10 may include a signal-receiving part 11, which receives electric signals transmitted from the signal-transmitting part 40 of the container support, a working coil 13, which generates a magnetic field by receiving current, a power supply part 15, which supplies current to the working coil 13, and a controller 17, which is connected to the signal-receiving part 11 and the power supply part 15.

The working coil 13 is mounted on the bottom surface of the table 1, and includes coils that are arranged concentrically with each other and parallel to the table 1.

The magnetic field, which is generated by the current flowing through the working coil 13, is directed perpendicular to the table 1.

The power supply part 15 may include an inverter 151, which controls the current that is supplied to the working coil 13 so that current is stably supplied in a predetermined range to the working coil 13.

The power supply part 15 is mounted on the bottom surface of the table 1.

The inverter 151 may receive current from an external power source 153.

The controller 17 may be connected to the power supply part 15, and may control the power supply part 15 so as to control the intensity of the current that is supplied to the working coil 13 and the current supply time.

The controller 17 may also be connected to the signal-receiving part 11 so as to receive electric signals that are transmitted to the signal-receiving part 11, and may control the power supply part 15 based on the electric signals.

FIG. 2 illustrates a container support according to one embodiment of the present invention. FIG. 3 illustrates a container support according to another embodiment of the present invention. Preferred embodiments of the container support of the present invention will now be described with reference to FIGS. 2 and 3.

The plate 20 is formed of a non-conductive material, through which current cannot flow. Preferably, the plate 20 may be made of a heat-resistant material, such as heat-resistant synthetic resin, heat-reinforced plastic, silicon, glass, or the like, so as to endure the heat of the cooking container 3. Therefore, even while the cooking container 3 is heated, the plate 20 is not heated.

The plate 20 may include a contact portion 21, on which the cooking container 3 is actually placed, and a non-contact portion 23, on which the cooking container 3 is not placed. The contact portion 21 may directly support the cooking container 3 placed thereon, and may be configured as a plate having various shapes, for example, a circular plate, a quadrangular plate, etc. The non-contact portion 23 may be formed so as to surround all or part of the periphery of the contact portion 21, and the manipulation unit 30 and the signal-transmitting part 40 may be provided at the non-contact portion 23.

The contact portion 21 may be formed integrally with the non-contact portion 23, or may be formed so as to be removable from the non-contact portion 23 so that only the contact portion 21 can be replaced when the contact portion 21 is damaged by the heated cooking container 3. In the case in which the contact portion 21 and the non-contact portion 23 are formed separately from each other, the contact portion 21 and the non-contact portion 23 may be made of different materials from each other.

As shown in FIGS. 2 and 3, the manipulation unit 30 may include manipulation buttons 31. The manipulation buttons 31 are provided at a portion of the plate 20 and receive control commands from a user.

More particularly, the manipulation buttons 31 are provided at the non-contact portion 23. The manipulation buttons 31 may include a power button 31*a*, which enables the user to turn on and off the induction heating unit 10, a course selection button 31*b*, which enables the user to select a cooking method (for example, steamed dish, soup, fried dish, stew, etc.), and an option selection button 31*c*, which enables the user to select the specific heating time, heating temperature, etc.

Referring to FIG. 2, the manipulation unit 30 may include a guide part 33*a*, which is disposed inside the plate 20, a temperature adjustment part (not shown), which is disposed inside the guide part 33*a*, and a sliding rod 33*b*, which is connected to the temperature adjustment part (not shown) and is exposed to the outside of the plate 20 through the guide part 33*a*.

When the user moves the sliding rod 33*b*, the temperature adjustment part (not shown), which is connected to the sliding rod 33*b*, regulates the heating temperature (for example, "off", "low", "medium" and "high", or from "off" to a specific temperature).

The container support 100 according to one embodiment of the present invention may further include a heating temperature display part 33*c*, which is provided at a portion of the plate 20 in order to display the heating temperature to the user depending on the position of the sliding rod 33*b*. The heating temperature display part 33*c* may be disposed on the top surface of the plate. Characters, for example, "OFF, LOW, MEDIUM, HIGH" or "OFF, LEVEL, MAXIMUM TEMPERATURE" may be displayed on the heating temperature display part 33*c* in a printed, engraved or embossed pattern.

Referring to FIG. 3, the manipulation unit 30 may include an adjustment knob 35, which is formed so as to be rotatable.

The adjustment knob 35 may be provided at a portion of the plate 20, more specifically, on the top surface of the non-contact portion 23.

The heating temperature and the heating time can be regulated depending on the angle by which the adjustment knob 35 is rotated. For example, the heating temperature or the heating time may be increased when the adjustment knob 35 is rotated clockwise, and may be decreased when the adjustment knob 35 is rotated counter-clockwise.

The manipulation unit 30 may include a combination of one or more of the manipulation buttons 31, the sliding rod 33*b* and the adjustment knob 35. FIG. 2 illustrates a combination of the manipulation buttons 31 and the sliding rod 33*b*, and FIG. 3 illustrates a combination of the manipulation buttons 31 and the adjustment knob 35.

FIG. 4 is a block diagram illustrating the relationship between the container support and the induction heating unit.

Referring to FIG. 4, the signal-transmitting part 40 of the container support is provided at a portion of the plate 20 and transmits electric signals to the induction heating unit 10.

The electric signals transmitted from the signal-transmitting part 40 may be control commands received by the manipulation unit 30, temperature information detected by a temperature sensor 50 (which will be described later), and so on.

The signal-transmitting part 40 may transmit electric signals in a wireless communication manner using, for example, Bluetooth, radio frequency identification (RFID), infrared data association (IrDA), ultra wideband (UWB), ZigBee, etc.

The container support according to one embodiment of the present invention may further include a display unit 60, which is provided at a portion of the plate 20 and displays cooking information to the user.

The display unit 60 may be provided at the non-contact portion 23 and may display cooking information to the user.

The display unit 60 may be connected to the manipulation unit 30 and may display control commands, input to the manipulation unit 30, to the user.

The display unit 60 may be operated in conjunction with the manipulation unit 30 so as to display images for enabling the user to set the cooking course (for example, steamed dish, soup, stew, etc.) and the cooking options (for example, a heating time, a heating temperature, etc.). Therefore, the user may select the desired cooking course or options by manipulating the manipulation unit 30 based on the image displayed on the display unit 60.

The display unit 60 may display the heating intensity set by the user, the heating temperature set by the user, the measured temperature of the cooking container, the heating time set by the user, the total cooking time, the remaining cooking time, the power on/off state of the induction heating unit, etc.

The display unit 60 may be connected to a temperature sensor 50, which will be described later, and may display the heating temperature of the cooking container 3 that is heated. Therefore, the user is able to perform the desired cooking operation by regulating the heating temperature and the heating time based on the heating temperature displayed on the display unit 60.

The container support according to one embodiment of the present invention may further include a temperature sensor 50, which is provided at the plate 20 in order to measure the temperature of the cooking container 3.

A temperature sensor is a sensor that senses a temperature by converting heat into current and voltage, and is classified into a contact-type sensor and a non-contact-type sensor based on whether the sensor is in contact with the object to be measured. The contact-type sensor includes a thermocouple, a thermistor, an IC temperature sensor, and a resistance temperature detector, and the non-contact-type sensor includes an IR sensor and an infrared thermometer. It is preferable to use a temperature sensor, such as a thermocouple or a thermistor, which is in contact with the cooking container, in the present invention.

The temperature information detected by the temperature sensor 50 is transmitted to the induction heating unit 10 through the signal-transmitting part 40, and the induction heating unit 10 adjusts the intensity of the magnetic field depending on the temperature information transmitted thereto.

Therefore, when the user inputs a specific cooking temperature through the manipulation unit 30, the temperature sensor 50 measures the temperature of the cooking container 3 continuously or at predetermined time interval, and transmits the temperature information to the induction heating unit 10 so that the induction heating unit 10 adjusts the intensity of the magnetic field, thereby maintaining the actual cooking temperature at the desired cooking temperature set by the user.

In particular, the temperature information detected by the temperature sensor 50 is first transmitted to the signal-receiving part 11 of the induction heating unit 10 through the signal-transmitting part 40 of the container support, and is then transmitted to the controller 17. The controller 17 controls the power supply part 15 based on the temperature information transmitted thereto, and the power supply part 15 controls the supply of current to the working coil 13. As a result, the intensity of heating of the cooking container 3 is adjusted by adjusting the intensity of the magnetic field that is generated from the working coil 13.

The container support according to one embodiment of the present invention may further include a power supply part 70 for supplying power to the signal-transmitting part 40 or the display unit 60.

Although the power supply part 70 of the container support is illustrated in FIG. 2, it may also be applied to the container support according to another embodiment of the present invention.

The power supply part 70 of the container support receives power from the induction heating unit 10 in a wireless manner, and supplies power to the signal-transmitting part 40 or the display unit 60. That is, the power supply part 70 of the container support generates induced electromotive force using the magnetic field generated from the induction heating unit 10, and uses the induced electromotive force as a driving force.

Described in detail, the power supply part 70 of the container support may include a receiving coil 71 for generating induced current using the magnetic field generated from the working coil 13, and a charging part 73 for storing the power generated from the receiving coil 71.

The charging part 73 is connected to the signal-transmitting part 40 or the display unit 60, and transmits the power, which is stored in the charging part 73, to the signal-transmitting part 40 or the display unit 60 so as to drive the signal-transmitting part 40 or the display unit 60.

Meanwhile, a means for accurately placing the container support 100 according to one embodiment of the present invention at a position on the top surface of the table 1 that corresponds to the position of the induction heating unit 10 is needed.

To this end, the container support 100 according to one embodiment of the present invention may further include a magnetic field sensor 80, which is provided at the plate 20.

Using the magnetic field sensor 80, which is provided at the plate 20, it is determined whether the plate 20 is accurately placed at a position on the top surface of the table 1 that corresponds to the position of the working coil 13. As the distance between the working coil 13 and the cooking container 3 becomes larger, the amount of induced current generated from the cooking container 3 is remarkably reduced, and sufficient heat for cooking food is not generated. Therefore, it is important to accurately place the plate 20, on which the cooking container is placed, at a position on the top surface of the table 1 that corresponds to the position of the working coil 13.

That is, when the container support 100 and the induction heating unit 10 are positioned close to each other in the vertical direction of the table, the power generated by the magnetic field can be sufficiently transmitted, and the electric signals, such as temperature information, can be accurately transmitted and received.

The magnetic field sensor 80 senses the magnetic field and detects the intensity of the magnetic field. In the embodiment of the present invention, a plurality of magnetic field sensors 80 may be provided while being spaced a predetermined distance apart from the center portion of the plate 20, or may be provided while being dispersed throughout the surface of the plate 20.

Therefore, in the case in which the plate 20 is not accurately placed at a position on the top surface of the table 1 that corresponds to the position of the working coil 13, the intensity of the magnetic field detected by the magnetic field sensor 80 located close to the working coil 13 is relatively high, but the intensity of the magnetic field detected by the magnetic field sensor 80 located distant from the working coil 13 is relatively low.

In this case, the display unit 60 may display information instructing the user to shift the container support 100 toward the position where the intensity of the magnetic field detected by the sensor is relatively high. At this time, the information displayed on the display unit 60 may be represented by arrows or characters indicating directions.

In particular, referring to FIG. 3, the magnetic field sensor 80 may include a sensing coil 81 for generating induced current using the magnetic field, and a measuring part 83 for measuring the intensity of current generated from the sensing coil 81. Therefore, based on the intensity of the current measured by the measuring part 83, the intensity of the magnetic field passing through the sensing coil 81 can be detected.

As another means for accurately placing the container support, the container support according to a further embodiment of the present invention may further include a display device (not shown), which is provided at the table 1 in order to display information about the position of the induction heating unit 10 on the top surface of the table 1. The display device may include a light source such as an LED, which emits light when receiving power.

As still another means for accurately placing the container support, the container support according to a still further embodiment of the present invention may further include a projector (not shown), which projects an image onto the top surface of the table 1 in order to display information about the position of the induction heating unit 10 on the top surface of the table 1. The projector is disposed on the table 1, and projects an image indicating the position of the induction heating unit 10 onto the top surface of the table 1 so that the user can place the container support 100 at the accurate position.

MODE FOR THE INVENTION

Various embodiments have been described in the best mode for carrying out the invention.

INDUSTRIAL APPLICABILITY

The present invention provides a container support that is operated in conjunction with an induction heating unit, which is disposed beneath a table, thereby controlling the induction heating unit.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A container support configured to be operated in conjunction with an induction heating unit,
wherein the induction heating unit is fixed beneath a table, is configured to generate a magnetic field, and includes:
a working coil configured to generate the magnetic field by receiving current, and
a signal receiver configured to receive electric signals,
wherein the container support comprises:
a plate for supporting a cooking container placed thereon;
a manipulation unit provided at a first portion of the plate and configured to receive control commands from a user;
a magnetic field sensor provided at the plate to detect an intensity of the magnetic field generated by the working coil; and
a signal transmitter provided at a second portion of the plate and configured to transmit electric signals to the signal receiver of the induction heating unit,
wherein the container support is at least horizontally movable independent of the induction heating unit, a horizontal direction being a direction parallel to a top surface of the table,
wherein the container support is provided above the table, and
wherein the table is provided between the container support and the induction heating unit.

2. The container support according to claim 1, wherein the plate is made of a heat-resistant material, the heat-resistant material being one of heat-resistant synthetic resin, silicon, and glass.

3. The container support according to claim 1, further comprising:
a display unit provided at a portion of the plate and configured to display cooking information to a user.

4. The container support according to claim 3, further comprising: a temperature sensor provided at the plate to measure a temperature of the cooking container.

5. The container support according to claim 4, wherein temperature information detected by the temperature sensor is transmitted to the induction heating unit through the signal transmitter, and the induction heating unit adjusts the intensity of the magnetic field depending on the temperature information transmitted thereto.

6. The container support according to claim 4, wherein the induction heating unit includes:
a power supply part for supplying current to the working coil; and
a controller connected to the signal receiver and the power supply part.

7. The container support according to claim 6, wherein temperature information detected by the temperature sensor is transmitted by the signal transmitter to the signal receiver and the controller, and the controller controls the power supply part based on the detected temperature information, thereby adjusting the intensity of the magnetic field generated by the working coil.

8. The container support according to claim 3, further comprising:
a power supply part for supplying power to the signal transmitter or the display unit.

9. The container support according to claim 8, wherein the power supply part is configured to generate induced electromotive force from the magnetic field generated by the induction heating unit and to use the induced electromotive force as a driving force.

10. The container support according to claim 1, wherein the magnetic field sensor comprises a plurality of magnetic field sensors, and
wherein the plurality of magnetic field sensors are spaced at a predetermined distance apart from a center portion of the plate.

11. The container support according to claim 9, wherein the power supply part comprises:
a receiving coil configured to generate induced current from the magnetic field generated by the working coil, and
a charger configured to store power generated by the receiving coil.

12. The container support according to claim 11, wherein the charger is connected to the signal transmitter or the display unit, and transmits the stored power to the signal transmitter or the display unit to drive the signal transmitter or the display unit.

13. The container support according to claim 3, wherein the display unit is configured to display information instructing the user to shift the container support towards a position where the intensity of the magnetic field detected by the magnetic field sensor is relatively high.

14. The container support according to claim 13, wherein the information displayed on the display unit is represented by arrows or characters indicating directions.

15. The container support according to claim 3, wherein the display unit is configured to display information instructing the user to shift the container support towards a position where the intensity of the magnetic field detected by the magnetic field sensor is highest.

16. The container support according to claim 1, wherein the table has a surface without a recess.

17. The container support according to claim 1, wherein the container support is horizontally movable on the table without obstruction.

* * * * *